United States Patent Office 3,461,294
Patented Aug. 12, 1969

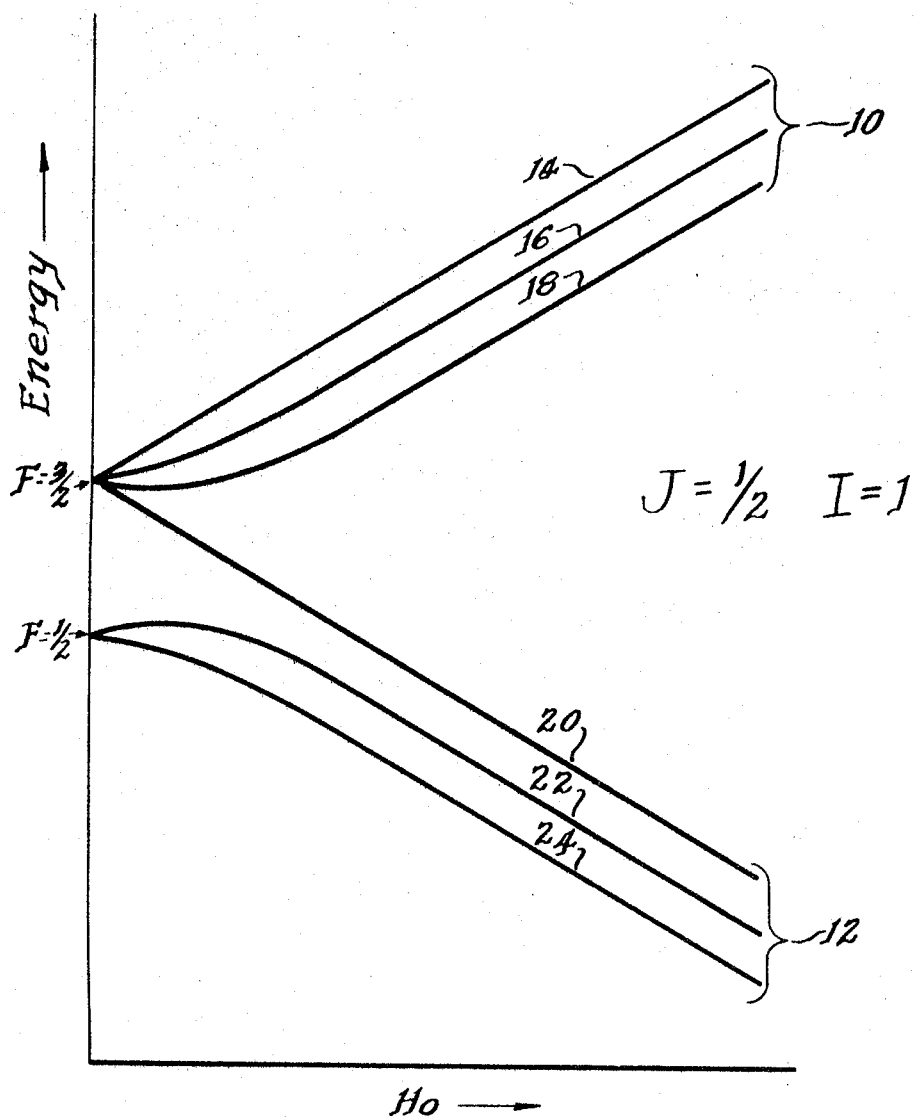

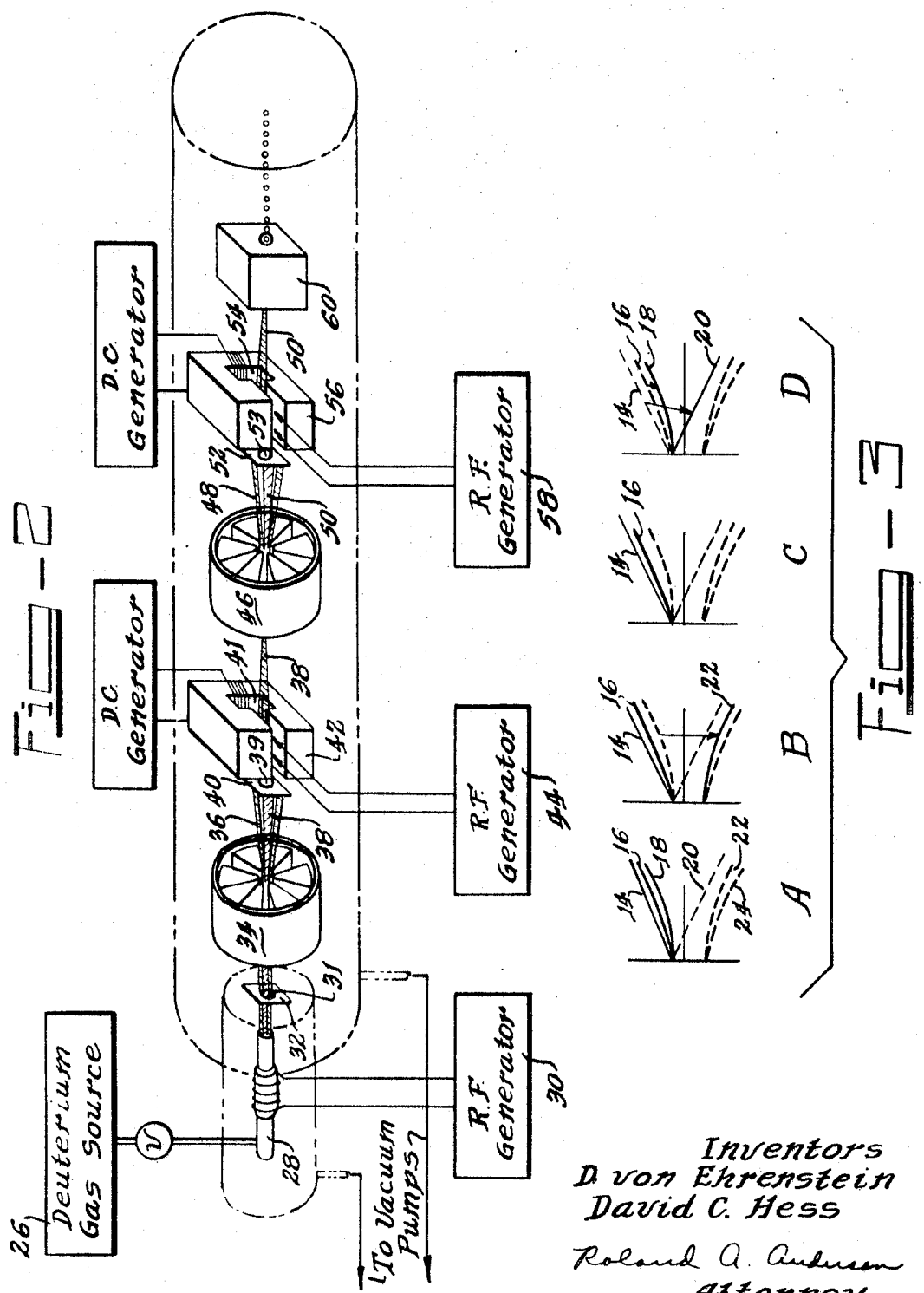

3,461,294
METHOD FOR GENERATING A BEAM OF IONS WHEREIN THE IONS ARE COMPLETELY POLARIZED
Dietes von Ehrenstein, Westmont, and David C. Hess, Downers Grove, Ill., assignors to the United States of America as represented by the United States Atomic Energy Commission
Filed Dec. 30, 1965, Ser. No. 517,868
Int. Cl. H01j 35/00; G01n 23/00
U.S. Cl. 250—84                                11 Claims

ABSTRACT OF THE DISCLOSURE

A method for producing a beam of completely polarized ions from a material whose atoms have a quantum number of the electron shell therein of ½ and a total nuclear angular momentum of 1 collimates the atoms of the material into a beam in a partial vacuum and passes the beam through a first nonuniform magnetic field to separate the atoms therein into first and second groups having respectively a quantum number of the electron shell of the atoms of said material of $+\frac{1}{2}$ and $-\frac{1}{2}$. Atoms contained in said second group are removed from said beam. The beam is then passed through combined DC and radio frequency magnetic fields which are angularly displaced with respect to each other an integral multiple of 90 degrees to effect transition in the quantum number of the angular momentum of the nucleus of the atoms of said material. The beam is then passed through a second nonuniform magnetic field to separate the atoms therein into third and fourth groups having respectively a quantum number of the electron shell of the atoms of said material equal to $+\frac{1}{2}$ and $-\frac{1}{2}$. The atoms, contained in said fourth group are removed from said beam and the remaining atoms in said beam are ionized to produce a beam of completely polarized ions.

---

The invention described herein was made in the course of, or under, a contract with the United States Atomic Energy Commission.

This invention relates to ionized beams and more specifically to a method for producing an ion beam wherein the ions are completely polarized.

Polarized ion beams are used in accelerators to strike targets of interest. These beams are presently produced by dissociating molecular material into its atomic form, if necessary, and collimating the atoms of the material into a beam. The beam is then sequentially passed through a multipole magnetic lens, a diaphragm and an adiabatic passage region into an ionizer. The ionizer ionizes the beam to produce an output beam of polarized ions, which polarized beam is injected into the accelerator for acceleration prior to striking the target of interest. Using this process, the ions, containing an atomic nucleus with an nuclear spin of one, in the output beam from the ionizer attain a maximum polarization of 66% or less of this theoretically possible value. It is desirable for accelerator usage that the ions in the output beam of the ionizer be completely polarized. Further, no present method exists to generate an intense beam of ions containing an atomic nucleus with a spin of one wherein the ions approach theoretically zero vector polarization and the polarization thereof approaches the theoretical maximum or minimum tensor polarization, which herein is also called complete polarization.

Accordingly, it is one object of the present invention to provide a method for generating a beam of ions wherein the ions are completely polarized.

It is another object of the present invention to provide a method for generating an intense beam of ions wherein the ions approach theoretically zero vector polarization and the polarization thereof approaches theoretically complete tensor polarization.

Further objects of the present invention will become more apparent as the detailed description proceeds.

In general, the present invention comprises the steps, collimating the atoms of the material into a beam and passing the beam through a first magnetic field to separate the atoms therein into first and second groups. Atoms contained in the second group are then removed from the beam and the beam is passed through combined direct-current and radio-frequency magnetic fields. The beam is then passed through a second magnetic field to separate the atoms therein into third and fourth groups. Atoms contained in the fourth group are removed from the beam and the beam is ionized to produce a beam wherein the ions are completely polarized.

Further understanding of the present invention may best be obtained from consideration of the accompanying drawings wherein:

FIG. 1 is a hyperfine-structure diagram of deuterium atoms.

FIG. 2 is a sketch of an apparatus for the practice of the present invention.

FIG. 3 is a hyperfine-structure diagram of deuterium atoms as they pass through the apparatus of FIG. 2.

For purposes of understanding, the method of the present invention will be described for the production of a deuteron beam wherein the deuterons are completely polarized. It is to be understood that the present invention is not to be limited to deuterons.

Reference is made to FIG. 1 wherein is shown a hyperfine-structure diagram of deuterium atoms. The atoms of deuterium may be divided into two groups. The first group 10 is designated wherein the quantum number of the angular momentum of the electron of the deuterium atom has a value equal to ½. The second group 12 is designated wherein the quantum number of the angular momentum of the electron of the deuterium atom has a value equal to $-\frac{1}{2}$. Within each group 10 and 12 there are three subgroups. Subgroups 14 of group 10 exists for $m_F = \frac{3}{2}$, $m_D = 1$ and $m_J = \frac{1}{2}$, wherein:

$m_F$ is defined as the quantum number of the angular momentum of the deuterium atom;

$m_D$ is defined as the quantum number of the angular momentum of the deuteron of the deuterium atom; and $m_J$ is defined as the quantum number of the angular momentum of the electron of the deuterium atom.

Subgroup 16 of group 10 exists for $m_F = \frac{1}{2}$, $m_D = 0$ and $m_J = \frac{1}{2}$; subgroup 18 of group 10 exists for $m_F = -\frac{1}{2}$, $m_D = -1$ and $m_J = \frac{1}{2}$; subgroup 20 of group 12 exists for $m_F = -\frac{3}{2}$, $m_D = -1$ and $m_J = -\frac{1}{2}$; subgroup 22 of group 12 exists for $m_F = -\frac{1}{2}$, $m_D = 0$ and $m_J = -\frac{1}{2}$; subgroup 24 of group 12 exists for $m_F = \frac{1}{2}$, $m_D = 1$ and $m_J = -\frac{1}{2}$.

In FIG. 1, the designation of F is used to denote the total quantum number of the deuterium atom, J is used to denote the quantum number of the electron or electron shell and D is used to denote the quantum number of the deuteron, or the total nuclear angular momentum or nuclear spin thereof.

All atoms of deuterium will form into one of the above-described subgroups. The application of the hyperfine-structure diagram of deuterium to the practice of the present invention will become more apparent when referenced to an apparatus for accomplishing the method.

Turning now to FIG. 2, wherein is shown an embodiment for the practice of the method of the present invention, a source 26 furnishes deuterium gas to a dissociator 28. The dissociator 28, energized by an R–F generator 30, is of conventional design. The deuterium gas from source 26 is furnished such that the pressure of the deuterium gas within the dissociator is approximately 1 mm. Hg. The dissociator 28 dissociates the deuterium molecules into deuterium atoms by an inductively coupled R-F discharge.

After dissociation, the deuterium atoms are passed through an aperture 31 in a diaphragm 32, whereby the deuterium atoms are collimated into a beam. The beam of deuterium atoms is then passed through the center of a magnetic multipole lens 34 having a nonuniform magnetic field. As the beam of deuterium atoms passes through the magnetic lens 34, atoms whose quantum number of the angular momentum of the electron therein equal $+\frac{1}{2}$ are attracted to low field regions, that is, the center of the multipole magnetic lens 34. The atoms of the deuterium beam whose quantum number of the angular momentum of the electron therein is equal to $-\frac{1}{2}$ are attracted to high field regions, that is, the outer limits of the multipole magnetic lens 34. Thus, the multipole magnetic lens 34 separates the atomic deuterium beam into two beams, one which diverges, 36, and one which does not, 38. The divergent beam 36 consists of group 12 atoms, hereinbefore described, and illustrated in the hyperfine-structure diagram of FIG. 1. The non-divergent beam 38 consists of group 10 atoms, hereinbefore described and illustrated in the hyperfine-structure diagram of FIG. 1.

A diaphragm 40 is inserted in the beams 36 and 38. The diaphragm 40 is positioned such that the aperture 39 thereof permits only the passage therethrough of beam 38. Thus, atoms contained in subgroup 12 are not passed by diaphragm 40. The beam 38, after passing through diaphragm 40, then passes through an adiabatic passage region 41 defined by magnet 42. The magnet 42 is a D-C magnet which produces a D-C magnetic field perpendicular to the direction of the beam 38. The D-C magnetic field also has a slight gradient in the direction of beam 38. An R-F generator 44 generates within the adiabatic passage region 41 an R-F magnetic field also perpendicular to the direction of the beam 38. The adiabatic passage region 41 acts on beam 38 to cause transition therein of atoms contained in subgroup 18 or group 10, hereinbefore described, such that the atoms in this group have quantum numbers $m_F=-\frac{1}{2}$, $m_D=0$ and $m_J=-\frac{1}{2}$. Thus, in effect, the adiabatic passage region transforms subgroup 18 of group 10 to the position formerly occupied by subgroup 22 of group 12 in the hyperfine-structure diagram hereinbefore described in FIG. 1.

The transformed beam 38 is then passed through the center of a multipole magnetic lens 46 having a nonuniform magnetic field. As the beam 38 passes through magnetic lens 46, the atoms contained therein having a quantum number of the angular momentum of the electron in the atom equal to $\frac{1}{2}$ are attracted to lower field regions within the lens, that is, the center of the multiple magnetic lens 46. The atoms contained in the beam 38 which have a quantum number of the angular momentum of the electron in such atoms equal to $-\frac{1}{2}$ are attracted to high field regions, that is, the outer limits of the multipole magnetic lens 46. Thus, as for the original beam, beam 38 is divided by magnetic lens 46 into two beams, 48 and 50. Beam 48 diverges and consists of atoms which were transformed from group 10 to group 12 in the first adiabatic transition region 41. The nondivergent beam 50 thus consists of atoms contained in subgroups 14 and 16 of group 10, hereinbefore described in the hyperfine-structure diagram of FIG. 1.

A diaphragm 52 is inserted in beams 48 and 50 after they emerge from magnetic lens 46. The diaphragm 52 has an aperture 53 therein which is positioned such that only beam 50 is permitted to pass therethrough. Beam 50 is then passed through an adiabatic passage region 54 defined by magnet 56. Magnet 56 is a D-C magnet which produces a D-C field perpendicular to the direction of the beam 48. The D-C field of magnet 56 also has a slight gradient in the direction of beam 50. An R-F generator 58 is used to produce an R-F field parallel to the D-C field from magnet 56. As beam 50 passes through the adiabatic passage region 54 created by the aforementioned R-F and D-C magnetic fields, a transition of the subgroups there is accomplished. As previously recited, beam 50 consists of atoms arranged in subgroups 14 and 16 of group 10 illustrated in the hyperfine-structure diagram of FIG. 1. The adiabatic passage region 54 transforms atoms contained in the beam 50 from subgroups 14 of group 10 such that they have a quantum number $m_F=-\frac{3}{2}$, $m_D=-1$ and $m_J=-\frac{1}{2}$. Adiabatic passage region 54 further transforms atoms contained in beam 50 from subgroup 16 of group 10 such that they have a quantum number $m_F=-\frac{1}{2}$, $m_D=-1$ and $m_J=\frac{1}{2}$. Thus, adiabatic passage region 54 effectively operates on beam 50 to transform subgroup 14 of group 10 to the position of subgroup 20 of group 12 and subgroup 16 of group 10 to the position of subgroup 18 of group 10, as shown in the hyperfine-structure diagram of FIG. 1. The emerging beam 50 from adiabatic passage region 54 consists of atoms which are contained in a subgroup whose quantum number is $m_F=-\frac{1}{2}$, $m_D=-1$ and $m_J=\frac{1}{2}$, or in a subgroup whose quantum number is $m_F=-\frac{3}{2}$, $m_D=-1$ and $m_J=-\frac{1}{2}$.

This beam is then passed through an ionizer 60 wherein the electrons are knocked from the atoms in beam 50 to leave deuterons which are completely polarized. The ionizer 60 is of conventional design wherein an electron gun generates an electron beam and a magnet generates a strong D-C magnetic field which causes the electron beam to travel parallel to the direction of beam 50. The faster traveling electrons in the electron beam strip electrons from the atoms of beam 50 to produce the polarized deuterons hereinbefore described. The deuterons in the output beam of ionizer 60 are completely polarized.

Further understanding of the operation of the apparatus shown in FIG. 2 may be obtained by reference to FIG. 3. In FIG. 3, the hyperfine-structure diagram of FIG. 1 is shown as modified and affected by the apparatus of FIG. 2 as the beam of atoms passes therethrough. In FIG. 3A, a hyperfine-structure diagram is shown for the beam after passage through the diaphragm 40. The subgroups 14, 16 and 18, shown in solid lines, comprise that portion of the beam which has passed through diaphragm 40. Subgroups 20, 22 and 24, shown in dotted lines, represent that portion of the beam which was stopped by diaphragm 40. In FIG. 3B, the hyperfine-structure diagram is representative of the beam after passage through the first adiabatic passage region 41. In the hyperfine-structure diagram of FIG. 3B, subgroup 18 is shown as having been transformed to the position occupied by subgroup 22 in the hyperfine-structure diagram shown in FIG. 1. In FIG. 3C, the hyperfine-structure diagram is shown for the beam after passage through diaphragm 52. The diaphragm 52 passes only subgroups 14 and 16 therethrough and stops passage of the transformed subgroup 18. In FIG. 3D, the hyperfine-structure diagram is shown for the beam after passage through the adiabatic passage region 54. In FIG. 3D, the subgroup 14 has been transformed to the position previously occupied by subgroup 20 in the hyperfine-structure diagram of FIG. 1. Further, the subgroup 16 has been transformed to the position previously occupied by subgroup 18 in the hyperfine-structure diagram of FIG. 1.

The aforedescribed method with the apparatus of FIG. 1 results in an ionized beam whose deuterons are completely polarized. The beam has a fractional population in the nuclear substate which is $-1$, that is, the deuterons in the output beam are completely polarized in the $-1$ direction. To achieve this result with the aforementioned method, the following parameters of operation with the apparatus of FIG. 2 are acceptable. The apparatus of FIG. 2 is operated in a partial vacuum. The dissociator 28 up to the diaphragm 32 operates in a partial vacuum of approximately $10^{-4}$ mm. Hg. The remainder of the system beyond the diaphragm 32 up to the ionizer 60 operates at a partial vacuum of $10^{-6}$ mm. Hg. The dissociator R-F source 30 operates at a frequency of approximately 27 megacycles to produce the inductively coupled R-F discharge in the dissociator 28. The diaphragms 32, 40 and 52 have apertures therein approximately 10 mm. in diameter. The magnetic lenses 34 and 46 are of conventional design and may be 4, 6, 8 or more poles. Six-pole magnets are preferred with a 10 to 12 thousand gauss field on the pole tips thereof. The distance between opposing pole tips in each magnetic lens 34 and 46 is approximately 12 mm. In the adiabatic passage region 41, the D-C field generated by magnet 42 should be approximately 10 gauss and the R-F field generated by generator 44 approximately one gauss at 340 megacycles. The D-C field generated in the second adiabatic passage region 54 should have a value of approximately 10 gauss and the R-F field generated by R-F generator 58 a value of approximately one gauss at 10 megacycles. With the aforementioned parameters, the apparatus of FIG. 2 will operate to give an ionized beam whose deuterons are completely polarized.

The method hereinbefore described gives an output beam whose deuterons have a resulting population in a nuclear substate of $-1$. It is to be understood that the method of the present invention may be operated in other modes to give other resulting polarizations. This is fully illustrated in the following table.

| Mode | Transition after first magnetic lens 34 | Transition after second magnetic lens 46 | Resulting population $N_{m_D}$ | Vector polarization $P_3$ | Tensor polarization $P_{33}$ |
|---|---|---|---|---|---|
| I | 18→22 | 16→24 | $N_{+1}=1$ | +1 | +1 |
| II | 18→22 | 14→20, 16→18 | $N_{-1}=1$ | −1 | +1 |
| III | 14→20, 16→18 | 18→22 | $N_0=1$ | 0 | −2 |
| IV | 16→24 | None | $N_{+1}=0.5$, $N_{-1}=0.5$ | 0 | +1 |

In the above table, $N_{m_D}$ is defined as the fractional population of the deuterons in the output beam ionizer 60 in the nuclear substate $m_D$. $P_3$ is defined as a vector polarization of the deuterons in the output beam from ionizer 60 and is equal to $N_{+1}-N_{-1}$. $P_{33}$ is defined as the tensor polarization of deuterons in the output beam from ionizer 60 and is equal to $3(N_{+1}+N_{-1})-2$, which equals $1-3N_0$. It is to be remembered that $N_{+1}+N_{-1}+N_0=1$ in the practice of the present invention and that the values therefor in determining $P_3$ and $P_{33}$ are obtained from column $N_{m_D}$.

The prior-described method for the apparatus of FIG. 2 was the Mode II shown in the above table. With this mode, the deuterons in the output beam from ionizer 60 have a complete polarization in the $-1$ direction. In Mode I of the above table, the output beam from ionizer 60 contains deuterons completely polarized in the $+1$ direction. In Mode III of the above table, the output from the ionizer 60 is a beam whose deuterons are completely polarized in the 0 direction. In Mode IV of the above table, the output from beam 60 is a beam whose deuterons are completely polarized in the sense that no deuteron has a direction 0 and all the deuterons are divided in equal numbers between the $+1$ or $-1$ directions resulting in zero vector polarization and complete tensor polarization. The 0 direction of polarization is herein defined to be a plane perpendicular to an external magnetic field such as that generated in ionizer 60 parallel to the beam 50. The $+1$ and $-1$ directions are herein defined to be 180° out of phase with respect to each other and parallel to an external magnetic field such as that generated within ionizer 60.

To obtain the different modes of operation shown in the above table with the apparatus of FIG. 2, the same approximate operating parameters are used. However, it is necessary to change the R-F fields in the adiabatic passage regions 41 and 54. To obtain Mode I operation with the apparatus of FIG. 2, whereby an output beam from ionizer 60 is obtained whose resulting deuteron polarization is in the $+1$ direction, the R-F field within adiabatic passage region 54 established by R-F generator 58 is changed such that, instead of being perpendicular to the D-C field from magnet 56, it is parallel thereto. Further, the value of the field should be approximately one gauss at 360 megacycles. In this mode of operation, the adiabatic transition region 54 will operate on the beam 50 to transform subgroup 16 to the position formerly occupied by subgroup 24, as illustrated in the hyperfine-structure diagram of FIG. 1. Thus, the beam 50 emerges from the adiabatic region with atoms therein which are contained in a subgroup whose quantum number is $m_F=3/2$, $m_D=1$, $m_J=1/2$, or in a subgroup whose quantum number is $m_F=1/2$, $m_D=1$, $m_J=-1/2$.

To obtain Mode III operation with the apparatus of FIG. 2, whereby the output beam from ionizer 60 contains deuterons completely polarized in the 0 direction, the R-F field within adiabatic passage region 41 produced by the R-F generator 44 is changed such that its direction is perpendicular to the D-C field from magnet 42 rather than being parallel thereto and has a value of approximately one gauss at 10 megacycles. Further, the R-F field in the adiabatic passage region 54 produced by the R-F generator 58 is changed such that it is parallel to the D-C field from magnet 56 rather than perpendicular thereto and has a value of approximately one gauss at 340 megacycles. In this mode of operation, the adiabatic passage region 41 operates on the beam 38 to transform subgroup 14 to the position formerly occupied by subgroup 20 in the hyperfine-structure diagram of FIG. 1 and subgroup 16 to the position occupied by subgroup 18 in the hyperfine-structure diagram shown in FIG. 1. Thus, the beam 38 emerging from adiabatic passage region 41 consists of atoms which are contained in a subgroup whose quantum number is $m_F=-1/2$, $m_D=-1$ and $m_J=1/2$, or in a subgroup whose quantum number is $m_F=-3/2$, $m_D=-1$, $m_J=-1/2$. When beam 38 passes through magnetic lens 46, atoms in the beam 38 whose quantum number equals $m_F=-3/2$, $m_D=-1$, $m_J=-1/2$ are attracted to the high field regions of the lens 46 and are thus caused to form a divergent beam 48. Atoms in beam 38 having a quantum number $m_F=-1/2$, $m_D=-1$, $m_J=1/2$ are attracted to the lower field regions within the lens 46 and are caused to form a nondivergent beam 50. Diaphragm 52 passes only the nondivergent beam 50. Thus, beam 50 entering the adiabatic passage region 56 consists of atoms having a quantum number $m_F=-1/2$, $m_D=-1$, $m_J=1/2$. Adiabatic passage region 56 operates on beam 50 to transform the atoms contained therein from position 18 to position 22, shown on the hyperfine-structure diagram of FIG. 1. That is, adiabatic passage region 56 changes the atoms in beam 50 from having a quantum number $m_F=-1/2$, $m_D=-1$, $m_J=1/2$ to having a quantum number $m_F=-1/2$, $m_D=0$, $m_J=-1/2$. Thus, the beam 50 emerging from adiabatic passage region 56 in Mode III consists of atoms having a quantum number $m_F=-1/2$, $m_D=0$, $m_J=-1/2$.

To obtain Mode IV operation with the apparatus of FIG. 2, whereby output beam from ionizer 60 is produced containing deuterons whose polarization is half in the $-1$ direction and half in the $+1$ direction, the second adiabatic passage region 54 containing a D-C magnetic field from magnet 56 and an R-F magnetic field from R-F generator 58 is eliminated. The R-F field in the adiabatic passage region 41 is maintained parallel to the D-C field from magnet 42. The R-F field is adjusted such that the value thereof is approximately one gauss at 360 megacycles. In this mode of operation, the adiabatic passage region 41 operates on the beam 38 to transform atoms therein from subgroup 16 to the position formerly occupied by subgroup 24 in the hyperfine-structure diagram of FIG. 1. Thus, the beam emerging from adiabatic passage region 41 consists of atoms which are contained in subgroups 14, 18 and transformed subgroup 16. When beam 38 passes through magnetic lens 46, atoms in the beam 38 whose quantum number equals $m_F=\frac{1}{2}$, $m_D=1$, $m_J=-\frac{1}{2}$, that is transformed subgroup 16, are attracted to the high field regions within the lens 46 and are caused to form a divergent beam 48. Atoms in beam 38 having a quantum number $m_F=3/2$, $m_D=1$, $m_J=\frac{1}{2}$ or $$m_F=-\frac{1}{2}$$

$m_D=-1$, $m_J=\frac{1}{2}$, that is, subgroups 14 and 18, are attracted to the lower field regions within the lens 46 and are caused to form a nondivergent beam 50. Diaphragm 52 passes only the nondivergent beam 50. Thus, beam 50 emerging from diaphragm 52 consists of atoms having a quantum number $m_F=\frac{3}{2}$, $m_D=1$, $m_J=\frac{1}{2}$ or $$m_F=-\frac{1}{2}$$

$m_D=-1$, $m_J=\frac{1}{2}$. This beam, when ionized by ionizer 60, produces a beam whose deuterons are polarized half in the +1 direction, half in the −1 direction.

As stated supra, the method of the present invention should not be limited to the production of a polarized deuteron beam, but it is equally applicable to the production of a polarized ion beam of materials having a quantum number $I=1$ or $I=\frac{1}{2}$ and a quantum number $J=\frac{1}{2}$. For example, the method of the present invention is equally applicable to $Li^6$. For $Li^6$, completely polarized lithium ions may be produced by following the aforedescribed methods for deuterium. In the present specification, $m_I$ is used to mean the magnetic quantum number of the angular momentum of the nucleus in question.

Persons skilled in the art will, of course, readily adapt the general teachings of the invention to methods far different than the methods illustrated. Accordingly, the scope of the protection afforded the invention should not be limited to the particular methods illustrated in the drawings and described above, but should be determined only in accordance with the appended claims.

What is claimed is:

1. A method for producing a beam of completely polarized ions from a material whose atoms have a quantum number of the electron shell therein of ½ and a total nuclear angular momentum of 1, comprising the steps in a partial vacuum, collimating the atoms of said material into a beam, passing said beam through a first nonuniform magnetic field to separate the atoms therein into first and second groups having opposite polarity quantum numbers of the electron shell of the atoms contained therein, removing atoms contained in said second group from said beam, passing said beam through combined direct-current and radio-frequency magnetic fields to effect transition in the quantum number of the angular momentum of the nucleus of the atoms therein, said combined direct-current and radio-frequency magnetic fields being angularly displaced with respect to each other an integral multiple of 90 degress, passing said beam through a second nonuniform magnetic field to separate the atoms therein into third and fourth groups having opposite polarity quantum numbers of the electron shell of the atoms contained therein, removing atoms contained in said fourth group from said beam, passing said beam through second combined direct-current and radio-frequency magnetic fields to effect transition in the quantum number of the angular momentum of the nucleus of the atoms therein, and ionizing the atoms in said beam, whereby a beam of completely polarized ions is produced.

2. The method of claim 1 wherein the first combined radio-frequency and direct-current magnetic fields are parallel to each other and said second combined radio-frequency and direct-current magnetic fields are parallel to each other.

3. The method of claim 2 wherein said first combining radio-frequency magnetic field has a value of approximately one gauss at 340 megacycles, said second combining radio-frequency magnetic field has a value of approximately one gauss at 360 megacycles, and said first and second combining direct-current magnetic fields each have a value of approximately 10 gauss.

4. The method of claim 1 wherein the first combined radio-frequency and direct-current magnetic fields are parallel to each other and said second combined radio-frequency and direct-current magnetic fields are normal to each other.

5. The method of claim 4 wherein said first combining radio-frequency magnetic field has a value of approximately one gauss at 340 megacycles, said second combining radio-frequency magnetic field has a value of approximately one gauss at 10 megacycles and said first and second combining direct-current magnetic fields each have a value of approximately 10 gauss.

6. The method of claim 1 wherein the first combined radio-frequency and direct-current magnetic fields are normal to each other and said second combined radio-frequency and direct-current magnetic fields are parallel to each other.

7. The method of claim 6 wherein said first combining radio-frequency magnetic field has a value of approximately one gauss at 10 megacycles, said second combining radio-frequency magnetic field has a value of approximately one gauss at 340 megacycles, and said direct-current magnetic fields each have a value of approximately 10 gauss.

8. A method for producing a beam of completely polarized ions from a material whose atoms have a quantum number of the electron shell therein of ½ and a total nuclear angular momentum of 1, comprising the steps in a partial vacuum, collimating the atoms of said material into a beam; passing said beam through a first nonuniform magnetic field to separate the atoms therein into first and second groups; said first group containing atoms having a value $m_F=\frac{3}{2}$, $m_I=1$, $m_J=\frac{1}{2}$, $m_F=\frac{1}{2}$, $m_I=0$, $m_J=\frac{1}{2}$, $m_F=-\frac{1}{2}$, $m_I=-1$, $m_J=\frac{1}{2}$; said second group containing atoms having a value $m_F=-\frac{3}{2}$, $m_I=-1$, $m_J=-\frac{1}{2}$, $m_F=-\frac{1}{2}$, $m_I=0$, $m_J=-\frac{1}{2}$, $m_F=\frac{1}{2}$, $m_I=1$, $m_J=-\frac{1}{2}$, where $m_F$ is the quantum number of the angular momentum of the atom, $m_I$ is the quantum number of the angular momentum of the nucleus of the atom, $m_J$ is the quantum number of the angular momentum of the electron of the atom; removing atoms contained in said second group from said beam; passing said beam through combined direct-current and radio-frequency magnetic fields to transform the atoms in said first group having a value $m_F=-\frac{1}{2}$, $m_I=-1$, $m_J=\frac{1}{2}$, to atoms having a value $m_F=-\frac{1}{2}$, $m_I=0$, $m_J=-\frac{1}{2}$; passing said beam through a second nonuniform magnetic field to separate the atoms therein into third and fourth groups, said third group containing atoms having a value $m_F=\frac{3}{2}$, $m_I=1$, $m_J=\frac{1}{2}$, $m_F=\frac{1}{2}$, $m_I=0$, $m_J=\frac{1}{2}$; said fourth group containing atoms having a value $m_F=-\frac{1}{2}$, $m_I=0$, $m_J=-\frac{1}{2}$; removing atoms contained in said fourth group from said beam, passing said beam through combined direct-current and radio-frequency magnetic fields to transform atoms in said third group having a value $m_F=\frac{1}{2}$, $m_I=0$, $m_J=\frac{1}{2}$, to atoms having a value $m_F=\frac{1}{2}$, $m_I=1$, $m_J=-\frac{1}{2}$; and ionizing the atoms in said third group of said beam whereby a beam of completely polarized ions is produced.

9. A method for producing a beam of completely polarized ions from a material whose atoms have a quantum number of the electron shell therein of ½ and a total nuclear angular momentum of 1, comprising the steps in a partial vacuum, collimating the atoms of said material into a beam; passing said beam through a first non-uniform magnetic field to separate the atoms therein into first and second groups; said first group containing atoms having a value $m_F=\frac{3}{2}$, $m_I=1$, $m_J=\frac{1}{2}$, $m_F=\frac{1}{2}$, $m_I=0$, $m_J=\frac{1}{2}$, $m_F=-\frac{1}{2}$, $m_I=-1$, $m_J=\frac{1}{2}$; said second group containing atoms having a value $m_F=-\frac{3}{2}$, $m_I=-1$, $m_J=-\frac{1}{2}$, $m_F=-\frac{1}{2}$, $m_I=0$, $m_J=-\frac{1}{2}$, $m_F=\frac{1}{2}$, $m_I=1$, $m_J=-\frac{1}{2}$, where $m_F$ is the quatum number of the angular momentum of the atom, $m_I$ is the quantum number of the angular momentum of the nucleus of the atom, $m_J$ is the quantum number of the angular momentum of the electron of the atom; removing atoms contained in said second group from said beam; passing said beam through combined direct-current and radio-frequency magnetic fields to transform the atoms in said first group having a value $m_F=-\frac{1}{2}$, $m_I=-1$, $m_J=\frac{1}{2}$, to atoms having a value $m_F=-\frac{1}{2}$, $m_I=0$, $m_J=-\frac{1}{2}$; passing said beam through a second nonuniform magnetic field to separate the atoms therein into third and fourth groups; said third group containing atoms having a value $m_F=\frac{3}{2}$, $m_I=1$, $m_J=\frac{1}{2}$, $m_F=\frac{1}{2}$, $m_I=0$, $m_J=\frac{1}{2}$; said fourth group containing atoms having a value $m_F=-\frac{1}{2}$, $m_I=0$, $m_J=-\frac{1}{2}$; removing atoms contained in said fourth group from said beam, passing said beam through combined direct-current and radio-frequency magnetic fields to transform the atoms in said third group having a value $m_F=\frac{3}{2}$, $m_I=1$, $m_J=\frac{1}{2}$, to atoms having a value $m_F=-\frac{3}{2}$, $m_I=-1$, $m_J=-\frac{1}{2}$, and atoms having a value $m_F=\frac{1}{2}$, $m_I=0$, $m_J=\frac{1}{2}$, to atoms having a value $m_F=-\frac{1}{2}$, $m_I=-1$, $m_J=\frac{1}{2}$; and ionizing the atoms in said third group of said beam whereby a beam of completely polarized ions is produced.

10. A method for producing a beam of completely polarized ions from a material whose atoms have a quantum number of the electron shell therein of ½ and a total nuclear angular momentum of 1, comprising the steps in a partial vacuum, collimating the atoms of said material into a beam; passing said beam through a first nonuniform magnetic field to separate the atoms therein into first and second groups; said first group containing atoms having a value $m_F=\frac{3}{2}$, $m_I=1$, $m_J=\frac{1}{2}$, $m_F=\frac{1}{2}$, $m_I=0$, $m_J=\frac{1}{2}$, $m_F=-\frac{1}{2}$, $m_I=-1$, $m_J=\frac{1}{2}$; said second group containing atoms having a value $m_F=-\frac{3}{2}$, $m_I=-1$, $m_J=-\frac{1}{2}$, $m_F=-\frac{1}{2}$, $m_I=0$, $m_J=-\frac{1}{2}$, $m_F=\frac{1}{2}$, $m_I=1$, $m_J=-\frac{1}{2}$, where $m_F$ is the quatum number of the angular momentum of the atom, $m_I$ is the quantum number of the angular momentum of the nucleus of the atom, $m_J$ is the quantum number of the angular momentum of the electron of the atom; removing atoms contained in said second group from said beam; passing said beam through combined direct-current and radio-frequency magnetic fields to transform atoms contained in said first group of said beam having a value $m_F=\frac{3}{2}$, $m_I=1$, $m_J=\frac{1}{2}$ to $m_F=-\frac{3}{2}$, $m_I=-1$, $m_J=-\frac{1}{2}$, and atoms having a value $m_F=\frac{1}{2}$, $m_I=0$, $m_J=\frac{1}{2}$ to atoms having a value $$m_F=-\frac{1}{2}$$

$m_I=-1$, $m_J=\frac{1}{2}$; passing said beam through a second nonuniform magnetic field to separate the atoms therein into third and fourth groups; said third group containing atoms having a value $m_F=-\frac{1}{2}$, $m_I=-1$, $m_J=\frac{1}{2}$; said fourth group containing atoms having a value $m_F=-\frac{3}{2}$, $m_I=-1$, $m_J=-\frac{1}{2}$; removing atoms contained in said fourth group from said beam; passing said beam through second combined direct-current and radio-frequency fields to transform atoms in said third group of said beam having a value $m_F=-\frac{1}{2}$, $m_I=-1$, $m_J=\frac{1}{2}$ to $m_F=-\frac{1}{2}$, $m_I=0$, $m_J=-\frac{1}{2}$; and ionizing the atoms in said third group of said beam whereby a beam of completely polarized ions is produced.

11. A method for producing a beam of completely polarized ions from a material whose atoms have a quantum number of the electron shell therein of ½ and a total nuclear angular momentum of 1, comprising the steps in a partial vacuum, collimating the atoms of said material into a beam; passing said beam through a first nonuniform magnetic field to separate the atoms therein into first and second groups; said first group containing atoms having a value $m_F=\frac{3}{2}$, $m_I=1$, $m_J=\frac{1}{2}$, $m_F=\frac{1}{2}$, $m_I=0$, $m_J=\frac{1}{2}$, $m_F=-\frac{1}{2}$, $m_I=-1$, $m_J=\frac{1}{2}$; said second group containing atoms having a value $m_F=-\frac{3}{2}$, $$m_I=-1$$

$m_J=-\frac{1}{2}$, $m_F=-\frac{1}{2}$, $m_I=0$, $m_J=-\frac{1}{2}$, $m_F=\frac{1}{2}$, $m_I=1$, $m_J=-\frac{1}{2}$, where $m_F$ is the quantum number of the angular momentum of the atom, $m_I$ is the quantum number of the angular momentum of the nucleus of of the atom, $m_J$ is the quantum number of the angular momentum of the electron of the atom; removing atoms contained in said second group from said beam; passing said beam through combined direct-current and radio-frequency fields to transform the atoms in said first group of said beam having a value $m_F=\frac{1}{2}$, $m_I=0$, $m_J=\frac{1}{2}$, to $$m_F=\frac{1}{2}$$

$m_I=1$, $m_J=-\frac{1}{2}$; passing said beam through a second nonuniform magnetic field to separate the atoms therein into third and fourth groups; said third group containing atoms having a value $m_F=\frac{3}{2}$, $m_I=1$, $m_J=\frac{1}{2}$, $m_F=-\frac{1}{2}$, $m_I=-1$, $m_J=\frac{1}{2}$; said fourth group containing atoms having a value $m_F=\frac{1}{2}$, $m_I=1$, $m_J=-\frac{1}{2}$; removing atoms contained in said fourth group from said beam and ionizing the atoms in said third group of said beam whereby a beam of completely polarized ions is produced.

References Cited

UNITED STATES PATENTS

| | | | |
|---|---|---|---|
| 2,972,115 | 2/1961 | Zacharias et al. | 331—3 |
| 3,328,633 | 6/1967 | George | 250—41.3 |

WILLIAM F. LINDQUIST, Primary Examiner

U.S. Cl. X.R.

250—42